Nov. 28, 1967

R. L. GORRING 3,355,250

METHOD AND APPARATUS FOR DETERMINING THE DIFFUSIVITY OF POROUS SOLIDS

Filed Jan. 10, 1964

INVENTOR:
Robert L. Gorring

BY:

*James R. Hoatson Jr.*
*William H. Page II*

ATTORNEYS

Nov. 28, 1967          R. L. GORRING                3,355,250
            METHOD AND APPARATUS FOR DETERMINING
                THE DIFFUSIVITY OF POROUS SOLIDS
Filed Jan. 10, 1964                              3 Sheets-Sheet 2

INVENTOR:
Robert L. Gorring

BY:
*James R. Hoatson Jr.*
*William H. Page II*
ATTORNEYS

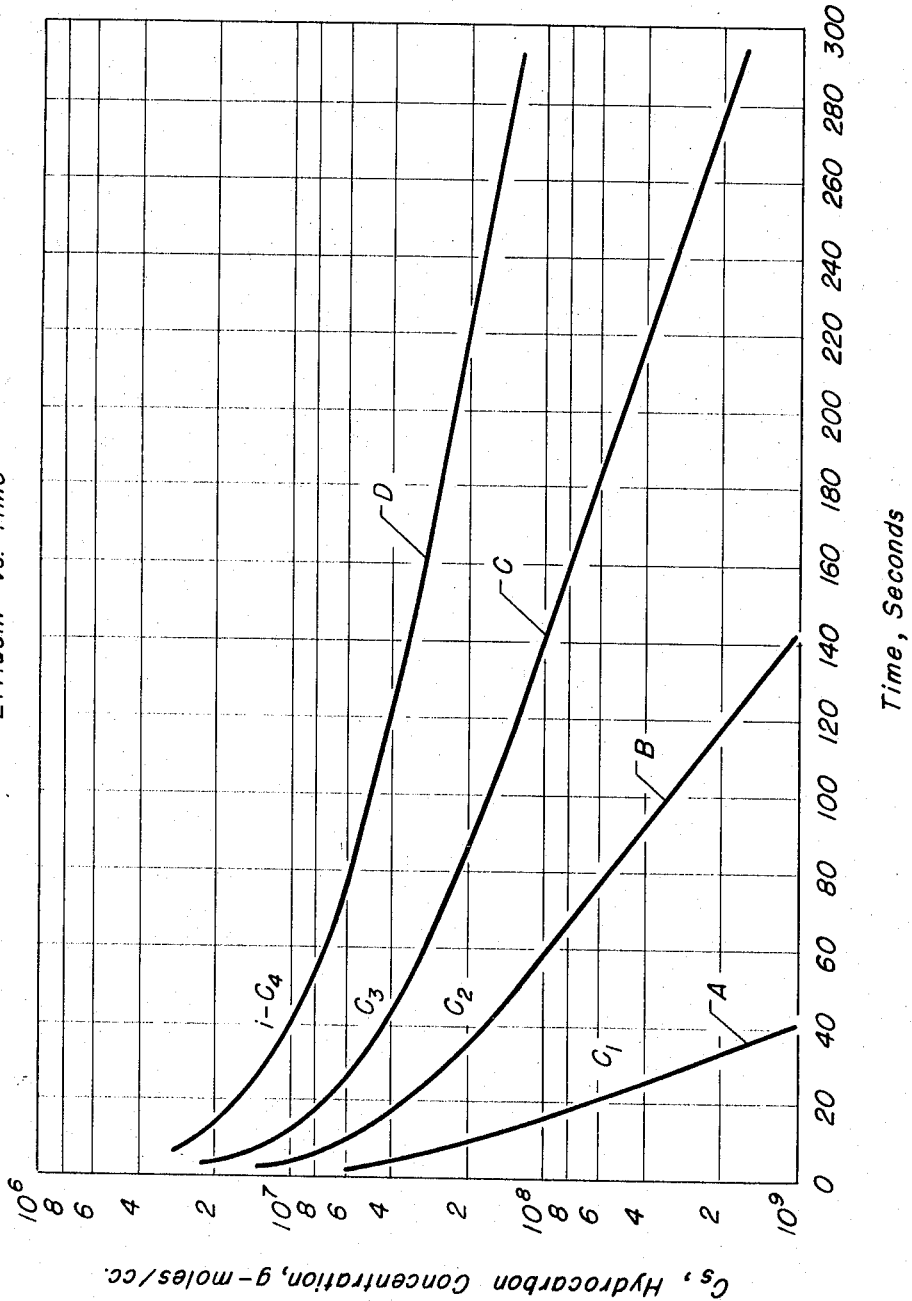

3,355,250
METHOD AND APPARATUS FOR DETERMINING THE DIFFUSIVITY OF POROUS SOLIDS
Robert L. Gorring, Haddon Heights, N.J., assignor to Universal Oil Products Company, Des Plaines, Ill., a corporation of Delaware
Filed Jan. 10, 1964, Ser. No. 336,987
19 Claims. (Cl. 23—232)

ABSTRACT OF THE DISCLOSURE

Determination of effective diffusivity of a porous catalyst with reference to a specific gas pair such as $N_2$-$CH_4$, $N_2$-$C_2H_6$, etc. A particle of the catalyst is presaturated with hydrocarbon, then rapidly switched into a $N_2$ or $H_2$ elutant stream. The hydrocarbon is eluted from the particle by a combined diffusion-desorption mechanism and the effluent is passed to a $H_2$ flame ionization detector. The detector drives a recorder producing a plot of hydrocarbon concentration vs. time over a test period of 10–300 seconds depending on carbon number. From this plot, the effective diffusivity is computed according to non-steady state diffusion theory. Apparatus includes a diffusion cell similar to a two position multiported rotary valve, modified to provide a chamber containing said particle and restraining it from displacement by gas impact forces.

---

This invention relates to a technique and apparatus for the experimental determination of the effective diffusivity of porous solids, in general, and more particularly of particle-form porous catalysts.

The concept of effective diffusivity of porous catalytic material is important in the catalysts art both from a theoretical and practical viewpoint. The overall process of chemical transformation on porous catalytic materials involves a definite number of steps linked in series. These are: first, diffusion of reactants to the gross exterior of the catalyst granule; second, diffusion of reactants through the porous matrix to the reactive surface; third, adsorption of reactants; fourth, reaction; fifth, desorption of products; sixth, diffusion of products through the porous matrix to the exterior surface of the granule; seventh, diffusion of reactants away from the exterior surface and into the fluid surrounding the granule. The particular conditions of reaction determine which of these steps is rate-limiting. The theory of pore diffusion-controlled reactions has been extensively studied by many workers in the field. It is known that the concentration gradients required to transport reactants into the reaction zone cause lowered concentrations in the interior of the catalyst granule which in turn result in a decreased reaction rate. The "effectiveness factor," which is the ratio of reaction rate under pore diffusion-controlled conditions to that which would occur if reactant concentration throughout the granule were uniform and equal to that at the exterior surface of the granule, is a function, inter alia of the effective diffusivity of the gaseous reactants in the catalyst granule. A quantitative measure of the influence of pore diffusion, for a given order of reaction and granule geometry, has been derived mathematically. Effective diffusivity also plays an important role in determining the maximum temperature in a catalyst granule, in calculating the effectiveness factor from a single measurement of conversion in an integral reactor, and in the kinetics of reactions in fixed catalyst beds.

According to the present technique, the diffusivity of a porous solid is determined by measuring the transient release of a hydrocarbon gas from the porous matrix of a particle of such solid. The particle are charged by exposure to contact with a hydrocarbon gas for a sufficient time to allow the pores to fill by diffusion, and physical adsorption equilibrium to be reached. The hydrocarbon-containing particle is then rapidly transferred out of contact with the gaseous hydrocarbon and into a flowing stream of a gaseous hydrocarbon-free elutant which flows over the surface of the particle and elutes the hydrocarbon via a combined diffusion-desorption mechanism. The hydrocarbon-containing elutant effluent stream is then sampled by a continuous hydrocarbon analyzer. The signal derived from the analyzer, which is proportional to instantaneous hydrocarbon concentration, may be used to drive a suitable indicator or preferably an automatic recorder whereby a continuous record of hydrocarbon concentration versus time may be produced. The effective diffusivity of the particle is then computed according to known mathematical techniques from the pen recording on the recorder chart.

Porous solids particularly suited to diffusivity measurements are characterized by a well defined micropore and/or macropore structure with pore diameters ranging from about 1 to about 1000 angstrom units and pore volumes ranging from about 0.1 to about 1.0 cubic centimeters per gram. Typical porous catalysts and catalyst bases, the preparation and use of which are well known in the art, include naturally occurring and synthetic refractory inorganic oxides such as silica, alumina, magnesia, zirconia, titania, silica-alumina, silica-magnesia, silica-zirconia, silica-titania, alumina-magnesia, alumina-zirconia, alumina-titania, magnesia-zirconia, magnesia-titania, zirconia-titania, and composites comprising three or more such oxides. Depending on the particular type of reaction to be catalyzed, such refractory inorganic oxide may be composited with catalytic amounts of one or more metals selected from Groups IB, VB, VIB, VIIB and VIII of the Periodic Table. Not only catalysts but other porous solids such as desiccants and selective adsorbents (silica gel, alkali metal aluminosilicates commonly known as "molecular sieves") may be tested by the instant method. The porous solid is preferably examined in granular form and these granules may be of any desired physical shape including spheres, spheroids, ellipsoids, cylinders or pellets, and cubes, as well as irregular granules. The particular geometry of the particle will affect only the mathematical treatment of the data. Data from the testing of spherical particles is most readily adapted to rigorous theoretical analysis. Spherical particles having a diameter in the range of 0.5 to 15 mm. are well suited for testing by the instant apparatus. The present method may be employed to study a single particle or a multi-particle batch; the time-varying output from the multi-particle system will reflect the true means diffusivity within a difinite time range.

By nonsteady state diffusion theory it can be shown that the hydrocarbon concentration $C_S$ in the elutant stream leaving a single porous spherical particle initially charged with $C_0'$ mols of hydrocarbon in the void space of the particle per unit volume of particle, and then switched into said elutant stream, is approximately given by:

$$\ln C_S = \ln\left[\frac{8C_0' De' \pi a}{\epsilon V_E}\right] - \left[\frac{De' \pi^2}{\epsilon(R+1)a^2}\right]t \quad (1)$$

$$R = \frac{S_0}{C_0'} \quad (2)$$

where
$De'$=effective diffusivity, cm.$^2$/sec.
$a$=radius of sphere, cm.
$\epsilon$=fraction voids in sphere
$V_E$=elutant flow rate, cc./sec.
$S_0$=mols hydrocarbon adsorbed on surface of particle per unit volume of particle at $t=0$
$t$=time, secs.

The mechanism described by Equation 1 is that of diffusion, accompanied by a nearly instantaneous physical desorption, of the gaseous hydrocarbon. Its derivation assumes that the diffusivity is constant and the adsorption isotherm is linear. Also, higher order terms in $t$, which are significant only for small values of $t$, have been dropped. When the experimentally observed $C_S$ values are plotted vs. time on semilog paper, an approximately straight line results from which the diffusivity $De'$ may be independently computed from either the slope or the $y$-intercept according to Equation 1. It will be apparent to those skilled in the art that analogous relationships can readily be developed for particles having a shape other than spherical.

As above noted the porous particle is first charged by exposure to contact with a gaseous hydrocarbon. This contacting may be effected in a stagnant volume of hydrocarbon but preferably is accomplished with a flowing stream thereof to reduce the time required to saturate the pores of the particle. Many different hydrocarbons may be utilized for this purpose including normal paraffins, isoparaffins, monoolefins, diolefins and polyolefins, and aromatic hydrocarbons. The choice of hydrocarbon will be governed somewhat by the pore diameter range of the particular porous material under test since the hydrocarbon molecule should be small enough in relation to the pore diameter to diffuse readily into and out of the porous matrix. Normally gaseous hydrocarbons are preferred because the test procedure may be conducted at ambient temperature. Alkanes containing from 1 to 4 carbon atoms are especially well suited; thus, methane, ethane, propane, butane and isobutane are particularly preferred as the saturating medium. In general the larger the hydrocarbon molecule the greater the deviation of experimental points from the curve of Equation 1 because absorption effects and surface diffusion become relatively important factors. The hydrocarbon saturating step may be conducted at any suitable temperature and pressure provided that reaction conditions are avoided, e.g., there must be no decomposition, dehydrogenation, polymerization, isomerization or other type of reaction involving the hydrocarbon taking place, particularly in view of the possibility that the porous solid may be a catalyst therefor. Temperatures in the range of 60–100° F. and pressures of from about atmospheric to about 5 p.s.i.g. are quite satisfactory, although it should be emphasized that these values are exemplary only and are not intended to be limiting upon the broad scope of the invention. The saturating gas may be a mixture of two or more hydrocarbons or it may be a substantially pure hydrocarbon. It is preferred that a pure hydrocarbon be employed to eliminate complications which might arise by reason of difference in adsorptivity and diffusivity. The time required to reach pore saturation will depend on various parameters such as the type of porous solid, the particular hydrocarbon employed, temperature, pressure and flow rate, and may range from about 10 seconds to about 5 minutes or more. A longer period should be allowed a heavier hydrocarbon than a lighter hydrocarbon.

After the porous particle has become saturated with hydrocarbon gas, it is then quickly switched into the flowing stream of a gaseous hydrocarbon-free elutant. The elutant is one which is non-reactive toward the hydrocarbon at the selected temperature and pressure conditions, but is capable of displacing the hydrocarbon from the porous matrix. Suitable elutants include the inert gases helium, neon and argon; nitrogen, hydrogen, carbon monoxide, carbon dioxide, and mixtures of two or more of these gases. The elutant should be substantially free of hydrocarbon so that the particle itself constitutes the sole source of hydrocarbon in the elutant effluent stream. As with the hydrocarbon saturating step, the elution step may be conducted at any suitable temperature and pressure provided that reaction conditions, are avoided, and such temperature and pressure are preferably about the same as those for the hydrocarbon saturating step. The elutant effluent or a portion thereof is passed to a suitable continuous automatic hydrocarbon analyzer which can be a hydrogen flame ionization detector, a radiological gas analyzer, an infrared adsorption spectrometer, an ultraviolet spectrometer, etc. The analyzer continuously measures the time varying hydrocarbon concentration in the sampled elutant effluent stream and the signal generated thereby may be employed to drive an indicator or preferably an automatic recorder for plotting hydrocarbon concentration as a function of time.

The method and apparatus of the invention may be more clearly understood by reference to the accompanying drawings of which:

FIGURE 8 is a semilog plot of typical hydrocarbon-time response curves for several different hydrocarbons being eluted from a porous sphere.

Figure 1:
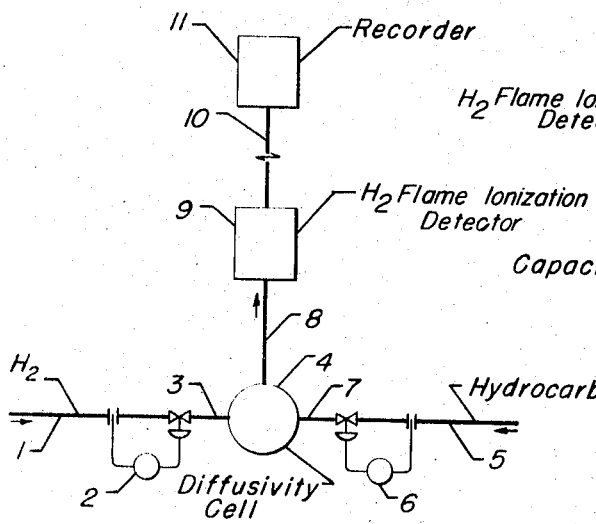
FIGURE 1 is a schematic flow diagram illustrating one embodiment of the invention including a two-position, three-port diffusivity cell.
Figure 2A:
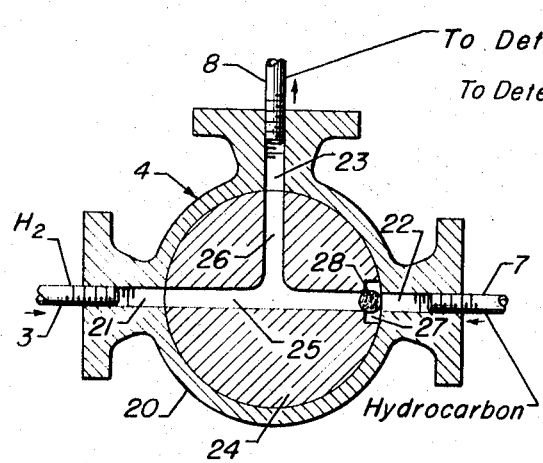
FIGURES 2a and 2b are enlarged sectional views of the diffusivity cell of FIGURE 1 in both of its two positions.
Figure 2B:
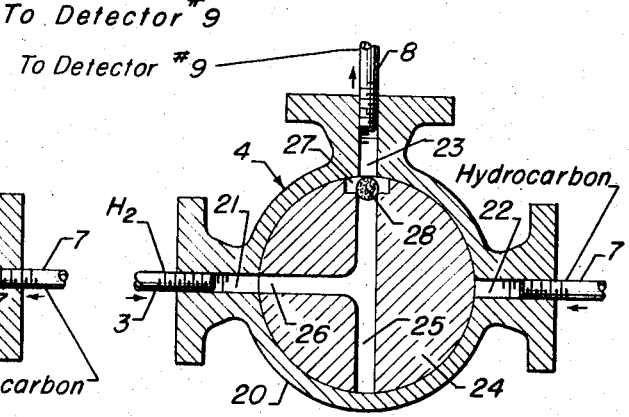

In the embodiment of FIGURES 1, 2a and 2b, there is shown a diffusivity cell indicated generally by numeral 4. The cell comprises an outer stator member 20 provided with inlet ports 21 and 22 and a single outlet port 23. Disposed within the stator is a rotary plug member 24 in which there is formed a capillary T-bore defined by a diametric passageway 25 intersected by the radial passageway 26. Passageway 25 terminates at one end thereof in an enlarged chamber 27 which is adapted to hold a porous particle 28. The particle may be placed therein by disassembling the rotor from the stator, manually loading the particle, and reassembling the rotor and stator. The size and arrangement of passageway 25, chamber 27, and ports 22, 23 is such that particle 28 is restrained from any substantial movement into passageway 25 or out of chamber 27 by force of impact of the flowing gas stream. For example, passageway 25 and ports 22, 23 may be of slightly smaller diameter than the smallest dimension of the particle or diameter of the particle if spherical; alternatively, passageway 25 and ports 22, 23 may be sized somewhat larger, and the particle may be retained in place by baffles, screening or the like, placed at either or both ends of chamber 27, so that there will result a small clearance between the surface of the particle and the walls of chamber 27 and passageway 25 to permit some unobstructed flow of gas to take place around the particle. The rotor and stator may be fabricated of any appropriate material such as carbon steel, brass, stainless steel, Teflon-coated metal or solid Teflon.

With reference to FIGURE 1, hydrogen gas is introduced through line 1, flow controller 2 and line 3 to inlet port 21 of cell 4. A hydrocarbon gas is introduced through line 5, flow controller 6 and line 7 to inlet port 22 of cell 4. A mixture of hydrogen and hydrocarbon is withdrawn from cell 4 through port 23 and is sent via line 8 into a hydrogen flame ionization detector 9, which receives its air supply by separate means not shown here. One suitable hydrogen flame ionization detector is the "FIAD" model manufactured by the Carad Corporation. As is well known, the hydrogen flame ionization detector generates a signal which is proportional to the total hydrocarbon concentration in the sample stream. This signal is transmitted via electrical line 10 to a potentiometric recorder 11. A suitable recorder is the Model G-10 manufactured by Varian Associates.

Diffusivity measurement is easily and accurately carried out by means of the above-described apparatus. A porous particle is placed in chamber 27 of diffusivity cell 4. The cell is initially turned to the "hydrocarbon load" position shown in FIGURE 2a. Hydrocarbon gas and hydrogen flows are maintained at constant rates. The hydrocarbon gas flows through and around the particle and then mixes with the incoming hydrogen at the center of the T. The hydrogen-hydrocarbon mixture is passed via line 8 to the detector unit 9 which is continuously burning. Saturation of the particle is indicated when the pen of recorder 11 lines out at a constant value; the gain of the detector will generally have to be reduced from that normally employed during the elution run in order that the recorder pen will remain on scale. Alternatively, the time required for pore saturation may be estimated by experience without bothering to obtain a positive check; for example, when using pure methane at atmospheric pressure, room temperature and a flow of 1–10 cc. per minute to saturate a porous sphere having a diameter in the range of 0.5–15 millimeters, a saturation time of about 60 seconds will usually be more than adequate. After the pores of the particle are saturated with hydrocarbon, rotor 24 of cell 4 is quickly switched through 90° to the "diffusion test" position shown in FIGURE 2b. The transfer time required to shift the particle from the position of FIGURE 2a to that of FIGURE 2b should be kept as short as practicable, generally less than about 2 seconds and preferably less than about 0.5 second, so that the precise instant when elution begins can be known with reasonable accuracy, also to minimize unrecorded loss of hydrocarbon from the particle and to prevent the detector flame from going out. With the diffusivity cell in the "diffusion test" position, the hydrocarbon flow is blocked off and the hydrogen gas now functions as the elutant as well as the fuel for detector 9. The hydrocarbon in the pores of the particle is gradually displaced by elutant via the mechanism of stagnant counter-diffusion. Recorder 11 continuously records the time-varying hydrocarbon concentration in the cell effluent, which decreases very nearly in accordance with the behavior predicted by Equation 1, supra. The effective diffusivity of the particle may then be computed from the pen recording by application of Equation 1. A variation of the FIGURE 1 embodiment is to employ $N_2$ as the elutant and to mix $H_2$ with the cell effluent; this arrangement is more flexible in that it permits independent adjustment of elutant rate and $H_2$ flow, the rangeability of the latter being somewhat limited by detector fuel requirements. The following specific example will further demonstrate the practice of the invention.

EXAMPLE I

A diffusivity cell, generally as shown in FIGURES 2a and 2b, was provided with a tapered rotor constructed of solid Teflon and having a diameter of 16 millimeters in the plane of the stator ports. The capillary T-bore (passageways 25, 26) was 1.5 millimeters in diameter. The particle chamber was formed as a right circular cylinder 6.4 mm. by 6.4 mm. A porous alumina sphere, 5.88 mm. in diameter, weight of 125.4 mg. and porosity $\epsilon=0.65$, was loaded into the chamber. The cell was incorporated in a system similar to that of FIGURE 1 except that a source of pure $N_2$ was connected to line 1 and ultra-pure $H_2$ (less then 10 p.p.m. total impurities) for the flame ionization detector was added to the cell effluent in line 8. A source of methane (C.P. grade) was connected to line 5. With the cell in the hydrocarbon load position, the gas flow rates were set at 30–40 cc./min. for $H_2$, 60–70 cc./min. for $N_2$ and 2–4 cc./min. for $CH_4$. The pressure of all gas streams was approximately 1 atmosphere at room temperature. After about 45 seconds the cell was switched to the diffusion test position, the flows of all streams except methane remaining the same. The recorder, using a 5-inch strip chart moving at 16 inches per minute, plotted the methane concentration in the cell effluent from time zero out to about 30 seconds. The observed response became purely first order after about 7 seconds and so was in agreement with the behavior predicted by Equation 1. The run was calibrated by switching a methane standard blend (50 p.p.m. $CH_4$ in $N_2$) into the cell at exactly the same flow rate as the pure $N_2$ used for the test, the cell being in the diffusion test position for this operation. The deflection of the recorder gave the response arising from a known methane rate to the burner under the conditions of the original diffusion experiment. From this, the instantaneous concentration of methane in the cell effluent during the experiment was determined. From elution data obtained after $t=7$ seconds, assuming $R=0$ in Equation 1, the effective diffusivity $De'$ of the alumina sphere was determined to be 0.00219 cm.$^2$/second.

For highly precise work the effect of dead space mixing in the specific apparatus should be checked. This is done by substituting, for the porous particle, a non-porous glass or metal sphere of the same diameter and running the test as before. This will give a hydrocarbon-time response curve which very rapidly drops to the baseline. The dead space mixing curve is then subtracted from the hydrocarbon elution curve to yield a curve uniquely characterizing the porous particle and independent of system volumes. The effect of dead space mixing for the specific apparatus of FIGURE 1 was found to be negligible after about 2 seconds from the time of switching.

Figure 3:
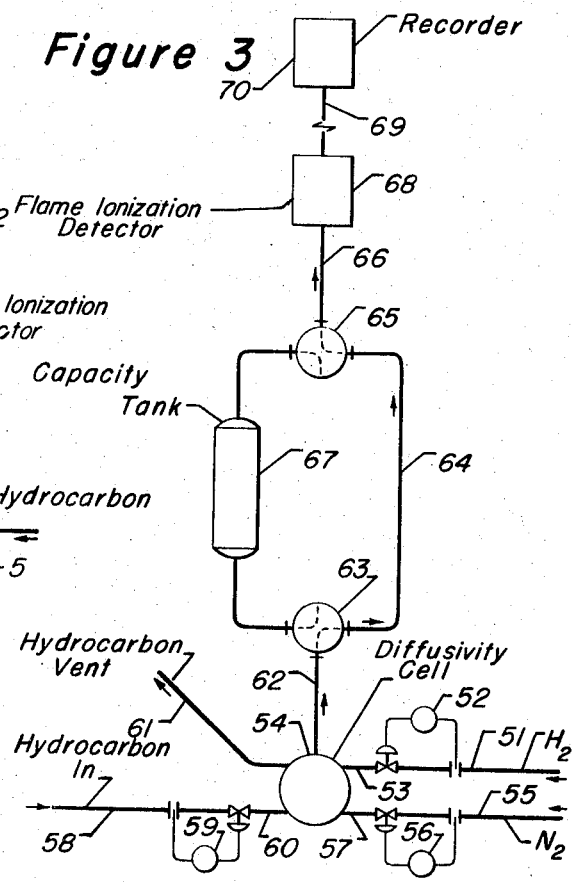
FIGURE 3 is a schematic flow diagram illustrating a second embodiment of the invention including a two-position, five-port diffusivity cell.
Figure 4:
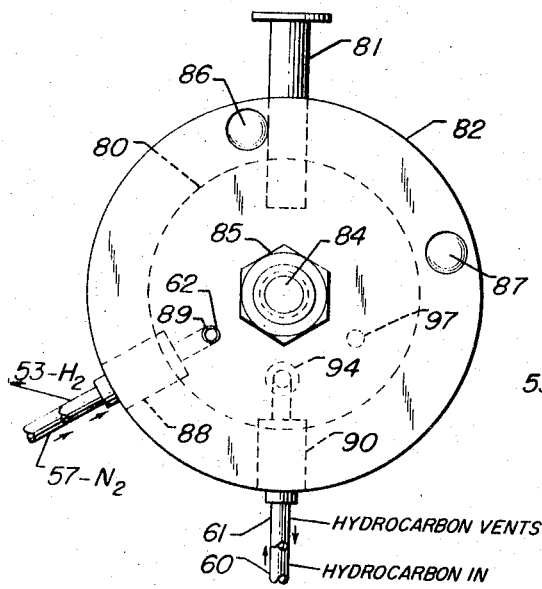
FIGURES 4 and 5 are enlarged plan and sectional elevation views, respectively, of the diffusivity cell of FIGURE 3 in its hydrocarbon saturating position.
Figure 5:
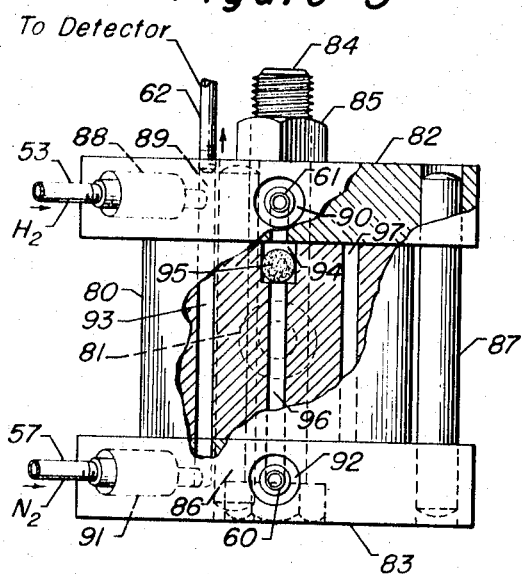

Another embodiment of the invention is illustrated by FIGURES 3 to 7 inclusive. In FIGURE 3 the diffusivity cell is indicated generally by numeral 54. Structural details of cell 54 are shown in FIGURES 4 and 5, to which reference is now made. The cell comprises a central cylindrical rotor member 80 sandwiched between top and bottom stator plates 82 and 83, and rotatable therebetween by means of a handle 81. The rotor and stator members are held together by a central bolt 84 and locknut 85 with sufficient force to assure a leak-tight seal at the bearing surfaces while allowing the rotor to turn freely. If desired, appropriately drilled Teflon gaskets may be inserted in the upper and lower bearing surfaces to improve sealing characteristics and to reduce friction. A pair of peripherally spaced guide pins 86 and 87 serves to rigidify the upper and lower stator plates and to provide operating limit stops for handle 81. Radial ports 88 and 90 are formed in the upper plate 82. Port 88 communicates with a transverse stator passageway 89, while port 90 is extended through a downwardly oriented 90° bend to an opening in the undersurface of stator 82. Radial ports 91 and 92 are formed in the lower plate 83. Each of ports 91 and 92 is extended via an upwardly oriented 90° bend to a corresponding opening in the upper surface of stator 83. Ports 88, 90, 91 and 92 are tapped for pipe threads and are adapted to receive tubing-to-pipe connectors. Rotor 80 is provided with three circumferentially spaced transverse passageways 93, 96 and 97. The upper end of intermediate passageway 96 is enlarged to provide a particle holding chamber 94 adapted to retain a porous particle 95; chamber 94 in cooperation with stator 82 restrains the particle from any appreciable vertical movement by gas entrainment.

In FIGURES 4 and 5 the diffusivity cell is in its "hydrocarbon load" position. Handle 81 abuts the guide pin 86. Rotor passageway 93 registers with upper stator passageway 89 and also with lower port 91; chamber 94 communicates with upper port 90 and, via passageway 96, with lower port 92; passageway 97 is blocked off at both ends. Nitrogen is introduced through line 57, port 91, and flows through passageways 93 and 89, mixes with hydrogen from line 53 and port 88, and the $N_2$-$H_2$ mixture leaves through line 62. Hydrocarbon gas in introduced through line 60, port 92, flows through passageway 96 and around particle 95 and vents through port 90 and line 61.

Figure 6:
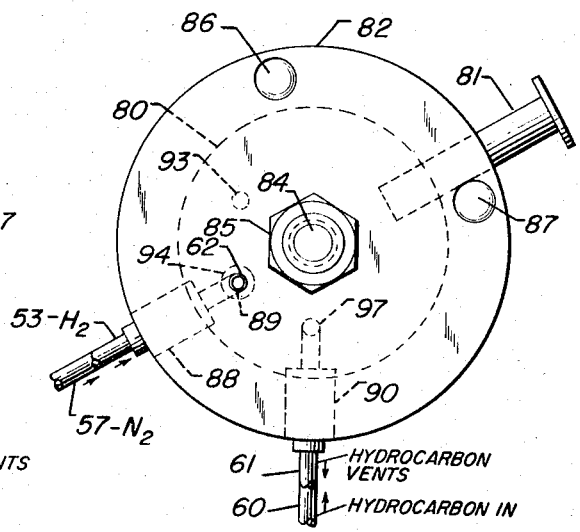
FIGURES 6 and 7 are plan and sectional elevation views, respectively, of the diffusivity cell of FIGURE 3 in its diffusion test position.
Figure 7:
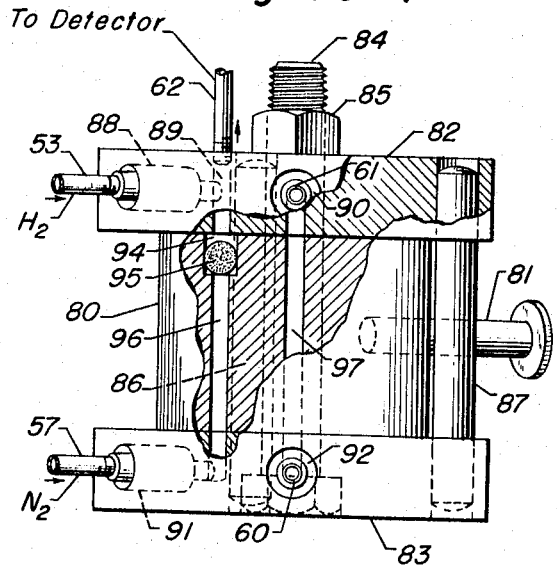

In FIGURES 6 and 7 the diffusivity cell is in its "diffusion test" position. Handle 81 now abuts the guide pin 87. Rotor passageway 93 is blocked off at both ends; chamber 94 communicates with upper stator passageway 89 and also through passageway 96 with lower port 91; passageway 97 communicates with upper port 90 and lower port 92. Nitrogen introduced through line 57 flows through passageway 96 and around particle 95 and into passageway 89 where it mixes with incoming hydrogen from line 53 and the hydrogen-hydrocarbon-nitrogen mixture leaves through line 62. Hydrocarbon gas introduced through line 60 and port 92 flows directly through passageway 97 and leaves through port 90 and line 61 to be vented.

Referring to FIGURE 3, hydrogen is introduced to diffusivity cell 54 through line 51, flow controller 52 and line 53. Nitrogen is introduced to the cell through line 55, flow controller 56 and line 57. Hydrocarbon gas is introduced to the cell through line 58, flow controller 59 and line 60; hydrocarbon is vented from the cell through line 61. Cell effluent removed through line 62 may take two alternate flow paths as determined by transfer valves 63 and 65. For the normal diffusion run, valves 63 and 65 are positioned as indicated so that the cell effluent from line 62 flows through line 64 and 66 to hydrogen flame ionization detector 68. Detector output is fed via electrical line 69 to recorder 70.

For the purpose of measuring the extent of hydrocarbon adsorption on a given porous solid, valves 63 and 65 are turned 90° clockwise so that capacity tank 67 is switched in series between lines 62 and 66, and the elution step is conducted as before. Integration of the area under the hydrocarbon-time response curve yields the total number of mols of hydrocarbon adsorbed on the porous particle and also contained in the void spaces thereof. From this data and from volumetric measurement of the adsorption isotherm of the particular hydrocarbon employed, the value of the adsorption coefficient R and initial charge concentration $C_0'$ in Equation 1 can be calculated. The capacity tank arrangement is desirable because the normal diffusion test response has a very sharp peak, sufficient to drive the recorder off-scale during the initial period of elution. The additional capacity inserted spreads out the hydrocarbon elution response to the point where the area of the resulting smooth curve can be measured by planimetry.

The experimental procedure involved in using the system of FIGURE 3 consists of four parts: (1) diffusion test, (2) adsorption measurement, (3) dead-space response, (4) detector calibration. In addition, several auxiliary measurements are made.

*Diffusion test*

The porous particle is loaded into the diffusivity cell and is preferably protected from direct impingement of the gas stream by a thin metal foil disc placed on the floor of chamber 94. With the rotor turned to the "diffusion test" position (FIGURE 7), the particle is purged by nitrogen. The nitrogen flow is stabilized at about 80 cc./min., the hydrogen flow at about 100 cc./min., and the hydrocarbon gas flow at about 5 cc./min. The rotor is next switched to the "hydrocarbon load" position (FIGURE 5) for a time sufficient to saturate the pore space completely (e.g., about 40–60 seconds when employing methane). The elution step is performed by rapidly turning (in about 0.2 second) the rotor element back to the test position, thus allowing the nitrogen stream to flow through chamber 94 and over the particle surface while the hydrocarbon stream is bypassed. During these operations the detector burner is always lit and all flow rates remain constant. Air for the detector burner is supplied externally. The eluted hydrocarbon concentration is automatically recorded to the limit of detectability.

*Adsorption measurement*

In point of time this step immediately precedes the diffusion test. Capacity tank 67, of approximately 200 cc. volume, is connected into the system. The same procedure as for the diffusion test is then followed. The area under the hydrocarbon-time curve is integrated by planimetry (or by a mechanical or electronic integrator) and from this the total mols of hydrocarbon $[C_0'+S_0]\times$ volume of particle] is computed.

*Dead-space response*

Dead space response from the unoccupied portion of chamber 94 is measured by replacing the test particle with a non-porous particle of the same size and repeating the diffusion test procedure.

*Detector response*

Detector response for all tests (diffusion, adsorption and dead-space response) is calibrated by substituting a nitrogen stream containing a known amount of hydrocarbon for the pure elutant nitrogen stream.

Auxiliary measurements include determination of skeletal density, surface area, pore size distribution, and volumetric measurement of the adsorption isotherm between 0 and 1 atmosphere pressure at 22° C.

The foregoing method is further illustrated by the following example.

EXAMPLE II

The effective diffusivity of a catalyst sphere was determined by the method and apparatus of FIGURE 3. The composition of the sphere was 96% silica-4% alumina. The sphere had a diameter of 3.89 mm., a density of 1.13 gm./cm.$^3$ and a porosity $\epsilon=0.462$. The porosity was determined from its measured skeletal density, $s$ (by air pycnometer) and particle density, $d$, from the relation:

$$\epsilon = 1 - d/s$$

Surface area of the sphere was determined by nitrogen BET to be 602 m.$^2$/gm. Average pore diameter was 30.1 A. and the diameter of the largest pore was 65.0 A., as measured by mercury porosimetry.

Four different diffusion test runs were made, employing the pure hydrocarbons methane, ethane, propane and isobutane, individually, as the diffusing gases. All experiments were run at 22±1° C. and 748±5 mm./Hg. Dead-space response was subtracted from the diffusion test response and the output was calibrated by a known N$_2$-hydrocarbon blend. Data points were selected randomly along the first order portion of the curve and were fitted to a function of a form of Equation 1 by the method of least squares. Effective diffusivity was independently computed from these least squares determined values of the slope B and intercept I by the equations:

$$De' = \frac{B\epsilon(R+1)a^2}{\pi^2} \quad (3)$$

$$De' = \frac{8IC_0'\pi a}{\epsilon(V_H+V_N)} \quad (4)$$

when $V_N$=N$_2$ flow, cc./sec.
$V_H$=H$_2$ flow, cc./sec.

Results of these tests are summarized in Table I:

TABLE I

| Diffusing Gas | Adsorption Coefficient, R | Effective Diffusivity, $De'$ | |
|---|---|---|---|
| | | From Slope | From Intercept |
| CH$_4$ | 2.14 | 0.000508 | 0.000519 |
| C$_2$H$_6$ | 11.3 | 0.000597 | 0.000616 |
| C$_3$H$_8$ | 40.7 | 0.000883 | 0.000744 |
| i-C$_4$H$_{10}$ | 105 | 0.00117 | 0.00106 |

Cell effluent concentration-time curves ($C_S$ vs. t) for the four hydrocarbon gases diffusing from the sphere are shown in FIGURE 8. The two major sources of disagreement between theory and data are deviation of the adsorption isotherm from linearity, and concentration dependence of surface diffusion coefficient. Qualitatively, the effect of these factors is virtually negligible in the case of methane and ethane, small in the case of propane, and moderately large for isobutane. The assumptions involved in derivation of the theory are most nearly satisfied when methane is employed as the diffusing gas. Methane therefore is recommended for diffusion tests. However, for smaller size materials, ethane may be advantageously employed for the purpose of obtaining better resolution between dead space and diffusion response.

The above-described single-particle measurement technique may also be used for a multi-particle sample, even where the diffusivities of the particles all differ. The hydrocarbon concentration being detected is the sum of the concentrations from all particles. Ultimate error will arise because, given enough time from the beginning of the elution step, the contribution to $C_S$ of the particle with the smallest value of slope will eventually predominate over all the others. However, statistical analysis shows that there exist a finite period of time, following switching of the multi-particle sample into the elutant stream, in which the approximation error remains within a predetermined tolerance. For example, assume a hypothetical batch of ten particles whose standard deviation is 0.1 and whose mean slope is 0.05 sec.$^{-1}$ and that 10% maximum error is acceptable, then the time within which this approximation error is 10% or less is about 9.4 seconds. Since higher order effects can be shown to be negligible beyond about 3 seconds, there is a definite time range within which the output from the multi-particle system reflects the true mean diffusivity. The data output in this time range can be easily handled by the method and apparatus of this invention.

Although the diffusivity cells shown in the drawings employ rotary plug members, it will be obvious to those skilled in the art that equivalent apparatus using linear or reciprocating plugs may be substituted therefor without departing from the spirit of the invention.

I claim as my invention:

1. Apparatus for determining the diffusivity of a porous solid which comprises means for contacting a particle of such porous solid with a gaseous hydrocarbon atmosphere, valve means for rapidly transferring the particle by physical movement of the particle from said hydrocarbon atmosphere into a stream of gaseous hydrocarbon-free elutant, means restraining said particle from substantial movement by said stream, and continuous hydrocarbon analyzing means sampling said stream at a point downstream from said particle.

2. Apparatus for determining the diffusivity of a porous solid which comprises means for contacting a particle of such porous solid with a first stream of hydrocarbon gas, valve means for rapidly transferring the particle by physical movement of the particle from said first stream into a second stream of gaseous hydrocarbon-free elutant, means restraining said particle from substantial movement by said streams, and continuous hydrocarbon analyzing means sampling said second stream at a point downstream from said particle.

3. The apparatus of claim 2 wherein an automatic recorder is coupled to said analyzing means for recording hydrocarbon concentration as a function of time.

4. Apparatus for determining the diffusivity of a porous solid which comprises a continuous hydrocarbon analyzing means, a movable chamber containing and restraining from substantial movement a particle of such porous solid, said chamber having two adjusted positions, said chamber in one position communicating with a source of hydrocarbon gas and in the other position communicating with a source of gaseous hydrocarbon-free elutant, and conduit means connecting the chamber in said other position at a point downstream from said particle with said analyzing means.

5. The apparatus of claim 4 wherein an automatic recorder is coupled to said analyzing means for recording hydrocarbon concentration as a function of time.

6. The apparatus of claim 4 wherein said analyzing means is a hydrogen flame ionization detector.

7. The apparatus of claim 4 wherein said conduit means includes a capacity tank.

8. A method of determining the diffusivity of a porous solid which comprises contacting a particle of such porous solid with a gaseous hydrocarbon atmosphere for a time sufficient to saturate the pores of said particle with the hydrocarbon, then rapidly transferring the particle from said hydrocarbon atmosphere into a stream of gaseous hydrocarbon-free elutant while restraining the particle from substantial movement by said stream, and continuously measuring the hydrocarbon concentration in said stream as a function of time at a point downstream from the particle, and computing from such measurement the diffusivity of said porous solid according to nonsteady state diffusion theory as exemplified by Equation 1 of the specification.

9. A method of determining the diffusivity of a porous solid which comprises contacting a particle of such porous solid with a gaseous hydrocarbon containing from 1 to 4 carbon atoms for a time sufficient to saturate the pores of said particle with the hydrocarbon, then rapidly transferring the particle out of contact with said hydrocarbon and into a stream of gaseous hydrocarbon-free elutant while restraining the particle from substantial movement by said stream, and continuously measuring the hydrocarbon concentration in said stream as a function of time at a point downstream from the particle, and computing from such measurement the diffusivity of said porous solid according to nonsteady state diffusion theory as exemplified by Equation 1 of the specification.

10. A method of determining the diffusivity of a porous solid which comprises contacting a particle of such porous solid with a gaseous alkane containing from 1 to 4 carbon atoms for a time sufficient to saturate the pores of said particle with the alkane, then rapidly transferring the particle out of contact with said alkane and into a stream of gaseous hydrocarbon-free elutant while restraining the particle from substantial movement by said stream, continuously measuring the alkane concentration in said stream at a point downstream from the particle, recording such concentration as a function of time, and computing from such record the diffusivity of said porous solid according to non-steady state diffusion theory as exemplified by Equation 1 of the specification.

11. The method of claim 10 wherein said alkane is methane.

12. The method of claim 10 wherein said alkane is ethane.

13. The method of claim 10 wherein said alkane is propane.

14. The method of claim 10 wherein said alkane is isobutane.

15. The method of claim 10 wherein said elutant is hydrogen.

16. The method of claim 10 wherein said elutant is nitrogen.

17. A method of determining the diffusivity of a porous catalyst which comprises contacting a particle of such catalyst with a first stream of hydrocarbon gas for a time sufficient to saturate the pores of said particle with the hydrocarbon, then rapidly transferring the particle from said first stream into a second stream of gaseous nitrogen while restraining the particle from substantial movement by said second stream, commingling a third stream of gaseous hydrogen with said second stream at a point downstream from said particle, passing a sample of the resulting mixed second and third streams to a hydrogen flame ionization detector, deriving from said detector a signal responsive to hydrocarbon concentration in said sample, transmitting said signal to an automatic recorder whereby to produce a continuous record of hydrocarbon concentration as a function of time, and computing from such record the diffusivity of said porous catalyst according to nonsteady state diffusion theory as exemplified by Equation 1 of the specification.

18. A method of determining the diffusivity of a porous catalyst which comprises contacting a substantially spherical particle of such catalyst with a first stream of a gaseous alkane containing from 1 to 4 carbon atoms for a time sufficient to saturate the pores of said particle with the alkane, then rapidly transferring the particle from said first stream into a second stream of gaseous nitrogen while restraining the particle from substantial movement by said second stream, commingling a third stream of gaseous hydrogen with said second stream at a point downstream from said particle, passing a sample of the resulting mixed second and third streams to a hydrogen flame ionization detector, deriving from said detector a signal responsive to alkane concentration in said sample, transmitting said signal to an automatic recorder whereby to produce a continuous record of alkane concentration as a function of time, and computing from such record the diffusivity of said porous catalyst according to nonsteady state diffusion theory as exemplified by Equation 1 of the specification.

19. The method of claim 18 wherein said spherical catalyst particle has a mean diameter in the range of 0.5–15 millimeters.

References Cited

UNITED STATES PATENTS 2,813,010  11/1957  Hutchins _____ 23—232
3,027,241  3/1962   Andreatch et al. __ 23—232 XR

OTHER REFERENCES

Stock, R., Anal. Chem. 33, No. 7, June 1961. Pages 966–967 relied on.

JOSEPH SCOVRONEK, *Acting Primary Examiner.*

MORRIS O. WOLK, *Examiner.*

R. M. REESE, *Assistant Examiner.*